(12) United States Patent
Kikuchi et al.

(10) Patent No.: US 12,216,070 B2
(45) Date of Patent: Feb. 4, 2025

(54) INSULATING DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Takuo Kikuchi, Kamakura (JP); Kazuyuki Ito, Kamakura (JP); Satoshi Akutsu, Yokohama (JP); Nobuaki Makino, Fujisawa (JP); Tatsuya Ohguro, Yokohama (JP); Yoshihiko Fuji, Nakatsu (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 344 days.

(21) Appl. No.: 17/663,306

(22) Filed: May 13, 2022

(65) Prior Publication Data
US 2022/0365011 A1 Nov. 17, 2022

(30) Foreign Application Priority Data
May 14, 2021 (JP) .................................. 2021-082465

(51) Int. Cl.
G01N 23/22 (2018.01)
G01N 23/2273 (2018.01)
H01P 1/36 (2006.01)

(52) U.S. Cl.
CPC .......... *G01N 23/2273* (2013.01); *H01P 1/36* (2013.01); *G01N 2223/61* (2013.01)

(58) Field of Classification Search
CPC ... G01N 23/2273; G01N 2223/61; H01P 1/36
See application file for complete search history.

(56) References Cited

U.S. PATENT DOCUMENTS

| 4,004,159 A * | 1/1977 | Rai ................... H01L 29/66825 |
|  |  | 438/972 |
| 2013/0037868 A1* | 2/2013 | Okamoto ............ H01L 21/0254 |
|  |  | 257/288 |

(Continued)

FOREIGN PATENT DOCUMENTS

| WO | 2012-256880 A | 12/2012 |
| WO | WO 2014/112179 A1 | 7/2014 |
| WO | 2020-129657 A | 8/2020 |

OTHER PUBLICATIONS

Lenahan, P.M. et al. "Microstructural Variations in Radiation Hard and Soft Oxides Observed Through Electron Spin Resonance" IEEE Transactions on Nuclear Science, vol. NS-30, No. 6, Dec. 1983 (3 pages).

*Primary Examiner* — Nicole M Ippolito
(74) *Attorney, Agent, or Firm* — Oblon, McClelland, Maier & Neustadt, L.L.P.

(57) ABSTRACT

An insulating device includes a first electrode, a second electrode, and an insulating film. The insulating film is located between the first electrode and the second electrode. The insulating film includes a positive charged region. The positive charged region is located at a portion in a direction from the first electrode toward the second electrode.

10 Claims, 11 Drawing Sheets

(56) References Cited

U.S. PATENT DOCUMENTS

| | | |
|---|---|---|
| 2013/0044441 A1 | 2/2013 | Dagdag et al. |
| 2017/0117602 A1 | 4/2017 | Mcloughlin et al. |
| 2018/0130867 A1 | 5/2018 | Lambkin et al. |
| 2020/0235197 A1 | 7/2020 | Sizov et al. |

* cited by examiner

INSULATING DEVICE

CROSS-REFERENCE TO RELATED APPLICATIONS

This application is based upon and claims the benefit of priority from Japanese Patent Application No. 2021-082465, filed on May 14, 2021; the entire contents of which are incorporated herein by reference.

FIELD

Embodiments relate to an insulating device.

BACKGROUND

To guarantee high electric field resistance in an insulating device such as a digital isolator or the like, a pair of electrodes is mutually insulated by interposing a thick insulating film. Electric field concentration at electrode end portions undesirably degrades the reliability of such an insulating device.

BRIEF DESCRIPTION OF THE DRAWINGS

FIGS. 5A and 5B show the molecular structure of silicon oxide.

FIGS. 6A and 6B show peaks corresponding to the 2p core level (Si 2p) of silicon of XPS (X-ray Photoelectron Spectroscopy) analysis results of silicon oxide, in which the horizontal axis is the binding energy, and the vertical axis is the detection intensity.

DETAILED DESCRIPTION

In general, according to one embodiment, an insulating device includes a first electrode, a second electrode, and an insulating film. The insulating film is located between the first electrode and the second electrode. The insulating film includes a positive charged region. The positive charged region is located at a portion in a direction from the first electrode toward the second electrode.

First Embodiment

Figure 1:
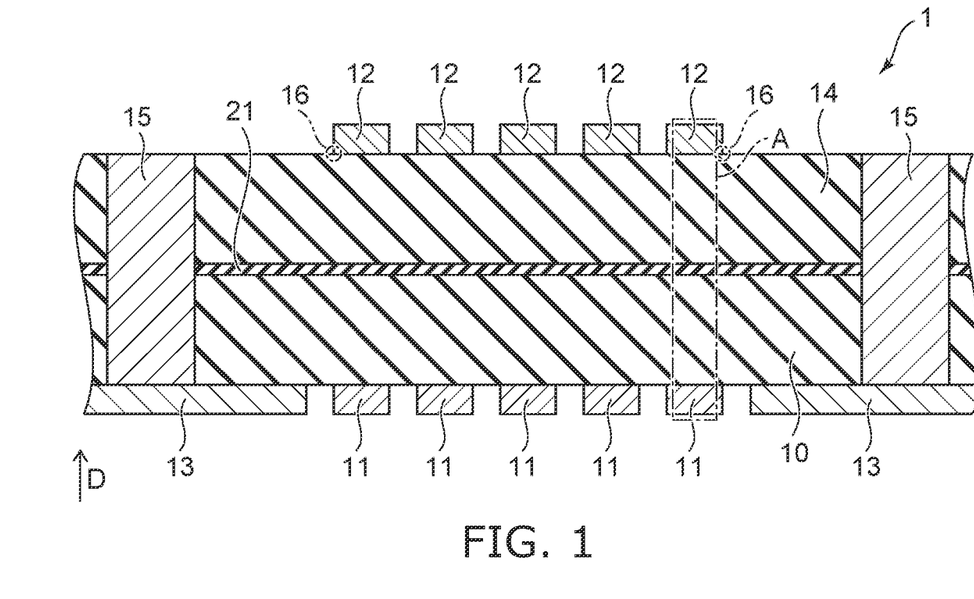
FIG. 1 is a cross-sectional view showing an insulating device according to a first embodiment.

FIG. 1 is a cross-sectional view showing an insulating device according to the embodiment.

The insulating device 1 according to the embodiment is, for example, a magnetic-insulating or capacitance-insulating digital isolator.

As shown in FIG. 1, the insulating device 1 includes a lower electrode 11, and an upper electrode 12 that is on the lower electrode 11 and is separated from the lower electrode 11. The lower electrode 11 and the upper electrode 12 are, for example, coils. An insulating film 10 is located between the lower electrode 11 and the upper electrode 12. All of the drawings are schematic views that do not necessarily correspond exactly to the actual product. For example, although five lower electrodes 11 and five upper electrodes 12 are illustrated in FIG. 1, the number of each electrode may be more than five, less than five, odd, or even.

The insulating film 10 includes, for example, silicon (Si) and oxygen (O), e.g., silicon oxide. A positive charged region 21 is included in the insulating film 10. The positive charged region 21 includes a positive charge and is positively charged. It is favorable for the charge density of the positive charged region to be not less than $1 \times 10^{16}$ cm$^{-3}$. As described below, for example, the positive charge is formed from hafnium oxide, by corona discharge, or from an oxygen deficiency in silicon oxide.

When the positive charged region 21 is generated by an oxygen deficiency, the oxygen concentration in the positive charged region 21 is less than the oxygen concentration in the region of the insulating film 10 other than the positive charged region 21. For example, the positive charged region 21 is made of SiO$_x$ (x being less than 2); and the region of the insulating film 10 other than the positive charged region 21 is made of SiO$_2$.

The direction from the lower electrode 11 toward the upper electrode 12 is taken as a "vertical direction D". The positive charged region 21 is located in a portion of the insulating film 10 in the vertical direction D. The thickness of the insulating film 10 in the vertical direction D is, for example, several μm to several tens of μm.

A ground electrode 13 is located at the periphery of the lower electrode 11. Multiple vias 15 are provided at the periphery of a portion 14 of the insulating film 10 positioned between the lower electrode 11 and the upper electrode 12.

The vias 15 are connected to the ground electrode 13. The vias 15 function as a magnetic shield. The ground electrode 13 and the vias 15 may not be included.

Figure 2A:
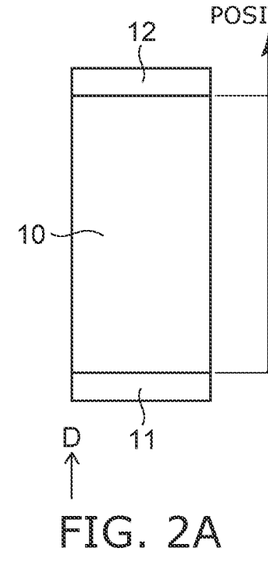
FIG. 2A is a partial cross-sectional view showing region A of FIG. 1.
Figure 2B:
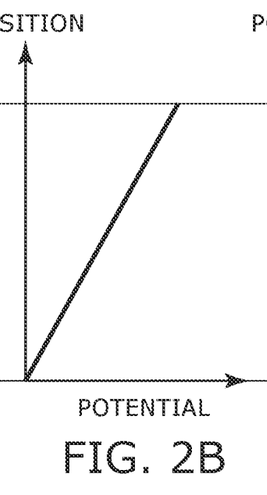
FIG. 2B is a graph showing a potential distribution inside the insulating film, in which the vertical axis is the position, and the horizontal axis is the potential.
Figure 2C:
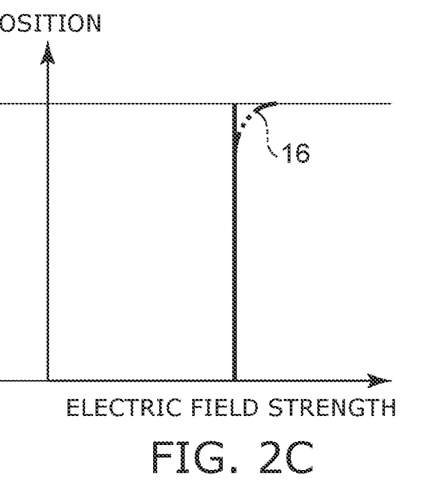
FIG. 2C is a graph showing the electric field strength distribution inside the insulating film, in which the vertical axis is the position, and the horizontal axis is the electric field strength.
Figures 2D, 2E:
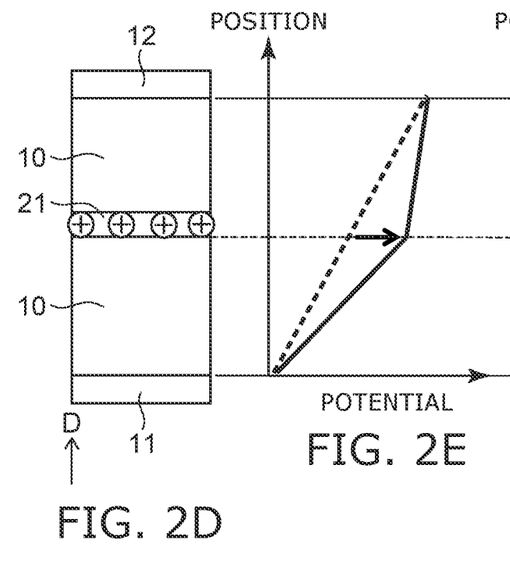
FIG. 2D is a partial cross-sectional view showing region A of FIG. 1.
FIG. 2E is a graph showing the potential distribution inside the insulating film, in which the vertical axis is the position, and the horizontal axis is the potential.
Figure 2F:
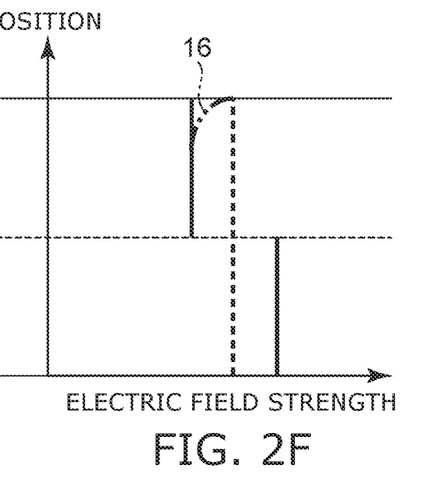
FIG. 2F is a graph showing the electric field strength distribution inside the insulating film, in which the vertical axis is the position, and the horizontal axis is the electric field strength.

FIG. 2A is a partial cross-sectional view showing region A of FIG. 1; FIG. 2B is a graph showing a potential distribution inside the insulating film, in which the vertical axis is the position, and the horizontal axis is the potential; FIG. 2C is a graph showing the electric field strength distribution inside the insulating film, in which the vertical axis is the position, and the horizontal axis is the electric field strength; FIG. 2D is a partial cross-sectional view showing region A of FIG. 1; FIG. 2E is a graph showing the potential distribution inside the insulating film, in which the vertical axis is the position, and the horizontal axis is the potential; and FIG. 2F is a graph showing the electric field strength distribution inside the insulating film, in which the vertical axis is the position, and the horizontal axis is the electric field strength.

FIGS. 2A to 2C show a reference example in which the positive charged region 21 is not included. FIGS. 2D to 2F show the embodiment in which the positive charged region 21 is included. The position of the vertical axis in FIGS. 2B and 2C corresponds to FIG. 2A. The position of the vertical axis in FIGS. 2E and 2F corresponds to FIG. 2D. In FIG. 2D, a positive charge is illustrated by a figure in which the symbol "+" is surrounded with a circle. This is similar for subsequent similar drawings as well. The graphs shown in FIGS. 2B and 2C are respectively shown by broken lines in FIGS. 2E and 2F.

When the insulating device 1 operates, a higher potential signal than that of the lower electrode 11 is input to the upper electrode 12. A ground potential is applied to the ground electrode 13. As a result, when the positive charged region 21 is not included inside the insulating film 10 as shown in FIG. 2A, the potential distribution is linear as shown in FIG. 2B, and the electric field strength is constant as shown in FIG. 2C. However, the electric field concentrates at the vicinity of a corner 16 of the upper electrode 12 shown in FIG. 1; therefore, the electric field strength increases more than the other portions as shown by the double dot-dash line in FIG. 2C. Therefore, there is a possibility that impact ionization may occur at the vicinity of the corner 16 in the insulating film 10, and avalanche breakdown may occur.

Conversely, in the insulating device 1 according to the embodiment as shown in FIG. 2D, the positive charged region 21 is included inside the insulating film 10. Therefore, as shown in FIG. 2E, the potential of the positive charged region 21 inside the insulating film 10 increases. As a result, as shown in FIG. 2F, the electric field strength distribution is nonlinear; and although the electric field strength increases in the portion of the insulating film 10 at the lower electrode 11 side of the positive charged region 21, the electric field strength decreases in the portion at the upper electrode 12 side. The increase of the electric field strength at the vicinity of the corner 16 can be suppressed thereby. As a result, avalanche breakdown does not easily occur, and the reliability of the insulating device 1 is increased.

Thus, according to the embodiment, by including the positive charged region 21 inside the insulating film 10, the electric field concentration at the vicinity of the corner 16 of the upper electrode 12 can be suppressed, and the reliability of the insulating device 1 can be increased. The electric field concentration at corners of the lower electrode 11 is relaxed by the ground electrode 13 located at the periphery of the lower electrode 11.

Methods for forming the positive charge inside the insulating film 10 will now be described.

First, a method for forming the positive charge from an oxygen deficiency will be described.

For example, the insulating film 10 is formed by depositing silicon oxide by plasma CVD (Chemical Vapor Deposition). A gas mixture made of silane ($SiH_4$), nitrous oxide ($N_2O$), oxygen ($O_2$), etc., is used as a plasma CVD source. Then, at the timing of forming the positive charged region 21, the composition of the source is modified to increase nitrogen (N) and reduce oxygen (O). The composition of the source is returned to the original when the formation of the positive charged region 21 is finished. The insulating film 10 that includes the positive charged region 21 is formed thereby.

A method for forming the positive charge by corona discharge will now be described.

The insulating film 10 is formed partway by depositing silicon oxide by plasma CVD. Then, at the timing of forming the positive charged region 21, the intermediate structure body is extracted from the plasma CVD apparatus; and corona discharge is applied. Thereby, a positive charge is stored in the exposed surface of the insulating film 10 of the intermediate structure body. Then, the intermediate structure body is returned to the plasma CVD apparatus; and silicon oxide is deposited by plasma CVD. The insulating film 10 that includes the positive charged region 21 is formed thereby.

A method for forming the positive charge from hafnium oxide will now be described.

The insulating film 10 is formed partway by depositing silicon oxide by plasma CVD. Then, at the timing of forming the positive charged region 21, the intermediate structure body is extracted from the plasma CVD apparatus; and hafnium oxide ($HfO_2$) is deposited by ALD (Atomic Layer Deposition). The layer that is made of hafnium oxide becomes the positive charged region 21. Then, the intermediate structure body is returned to the plasma CVD apparatus; and silicon oxide is deposited by plasma CVD. The insulating film 10 that includes the positive charged region 21 is formed thereby.

Second Embodiment

Figures 3A, 3B:
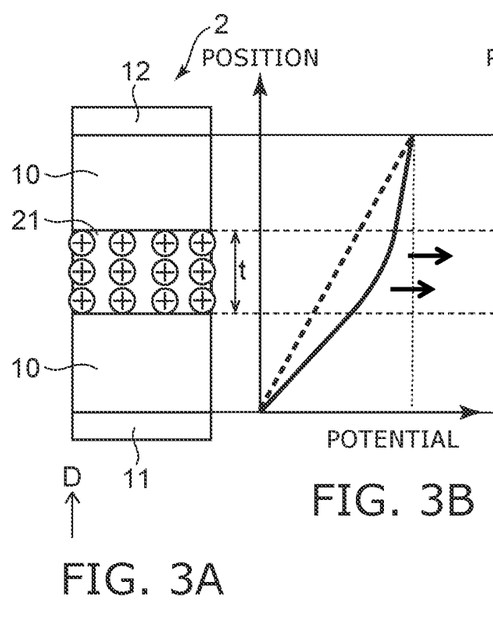
FIG. 3A is a partial cross-sectional view showing an insulating device according to a second embodiment.
FIG. 3B is a graph showing the potential distribution inside the insulating film, in which the vertical axis is the position, and the horizontal axis is the potential.
Figure 3C:
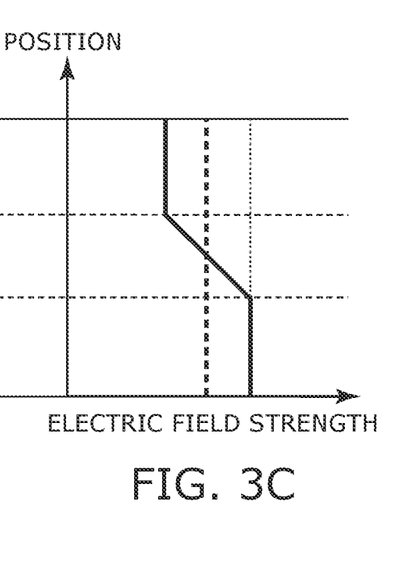
FIG. 3C is a graph showing the electric field strength distribution inside the insulating film, in which the vertical axis is the position, and the horizontal axis is the electric field strength.

FIG. 3A is a partial cross-sectional view showing an insulating device according to the embodiment; FIG. 3B is a graph showing the potential distribution inside the insulating film, in which the vertical axis is the position, and the horizontal axis is the potential; and FIG. 3C is a graph showing the electric field strength distribution inside the insulating film, in which the vertical axis is the position, and the horizontal axis is the electric field strength.

The region shown in FIG. 3A corresponds to region A of FIG. 1. The position of the vertical axis in FIGS. 3B and 3C corresponds to FIG. 3A. The graphs shown in FIGS. 2B and 2C are respectively shown by broken lines in FIGS. 3B and 3C.

As shown in FIG. 3A, in the insulating device 2 according to the embodiment, a thickness t in the vertical direction D of the positive charged region 21 is thick compared to that of the insulating device 1 according to the first embodiment. Therefore, as shown in FIG. 3B, the thickness of the portion of the insulating film 10 at which the potential increases is thick. As a result, as shown in FIG. 3C, the change of the electric field strength is gradual. Also, by increasing the thickness t, the charge amount that can be included in the positive charged region 21 is increased. It is favorable for the thickness t, i.e., the length along the vertical direction D of the positive charged region 21, to be not less than 500 nm.

Figure 4A:
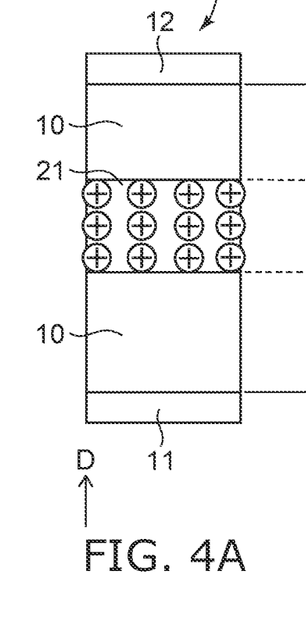
FIG. 4A is a partial cross-sectional view showing an insulating device according to the second embodiment.
Figure 4B:
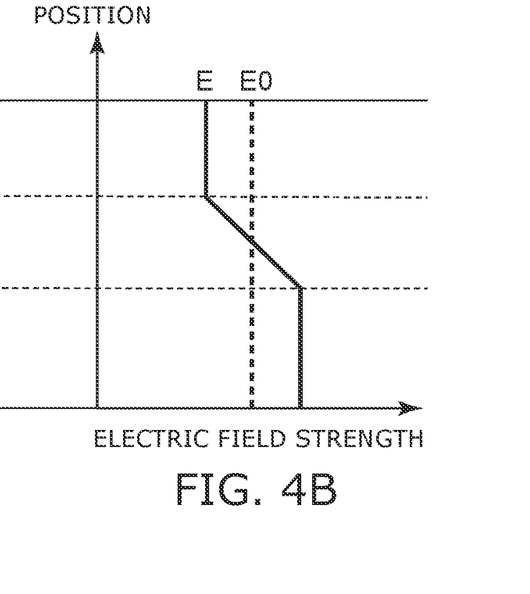
FIG. 4B is a graph showing the potential distribution inside the insulating film, in which the vertical axis is the position, and the horizontal axis is the electric field strength.

FIG. 4A is a partial cross-sectional view showing an insulating device according to the embodiment; and FIG. 4B is a graph showing the potential distribution inside the insulating film, in which the vertical axis is the position, and the horizontal axis is the electric field strength.

As shown in FIGS. 4A and 4B, the electric field strength at the interface between the insulating film 10 and the upper electrode 12 when the positive charged region 21 is not included is taken as E0; and the electric field strength at the interface between the insulating film 10 and the upper electrode 12 when the positive charged region 21 is included is taken as E. A value (E/E0) is defined as the electric field reduction ratio caused by the positive charged region 21.

Figure 4C:
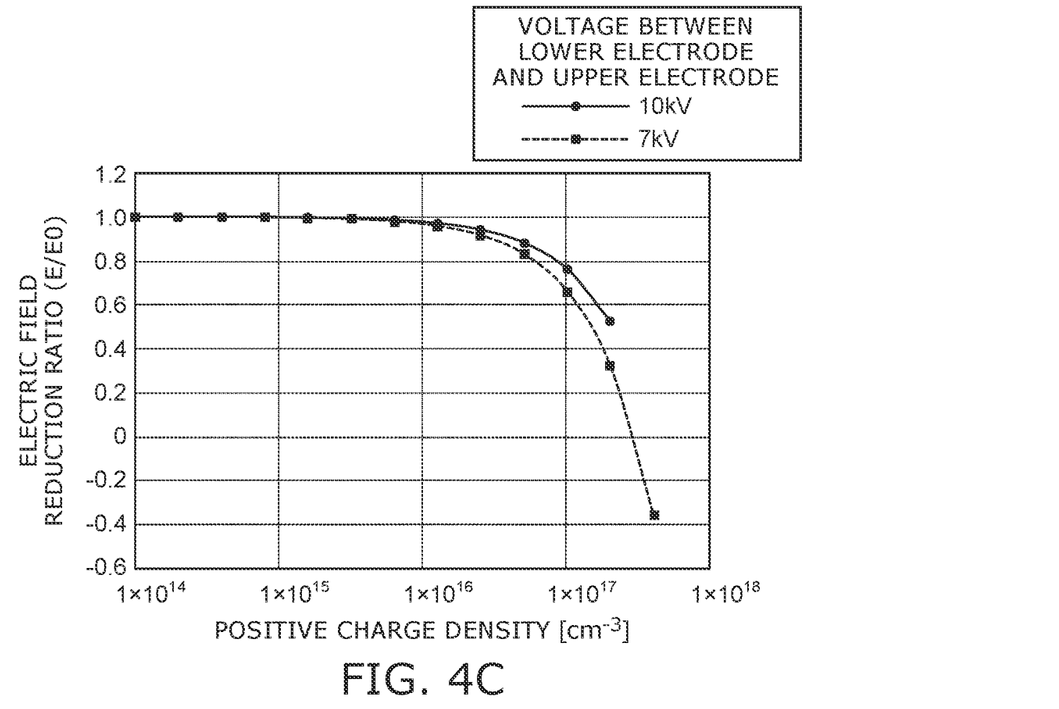
FIG. 4C is a graph showing the effects of the positive charge on the electric field strength distribution, in which the horizontal axis is the positive charge density in the positive charged region, and the vertical axis is the electric field reduction ratio (E/E0)

FIG. 4C is a graph showing the effects of the positive charge on the electric field strength distribution, in which the horizontal axis is the positive charge density in the positive charged region, and the vertical axis is the electric field reduction ratio (E/E0).

As shown in FIG. 4C, the electric field reduction ratio (E/E0) decreases as the positive charge density in the positive charged region 21 increases. It is confirmed in the example shown in FIG. 4C that the electric field reduction ratio (E/E0) decreases when the positive charge density is not less than $1 \times 10^{16}$ $cm^{-3}$. The electric field reduction ratio (E/E0) is not more than 0.8 when the positive charge density is not less than $1 \times 10^{17}$ $cm^{-3}$. It is favorable for the electric field reduction ratio to be enough to cancel the electric field concentration of the corner 16.

Otherwise, the configuration, the operations, and the effects according to the embodiment are similar to those of the first embodiment.

An example of a method for evaluating the positive charge density of the positive charged region 21 will now be described.

Figure 5A:
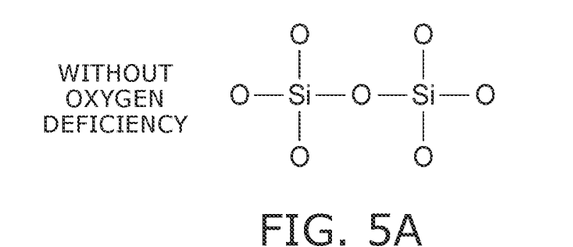
FIG. 5A shows a state without an oxygen deficiency.
Figure 5B:
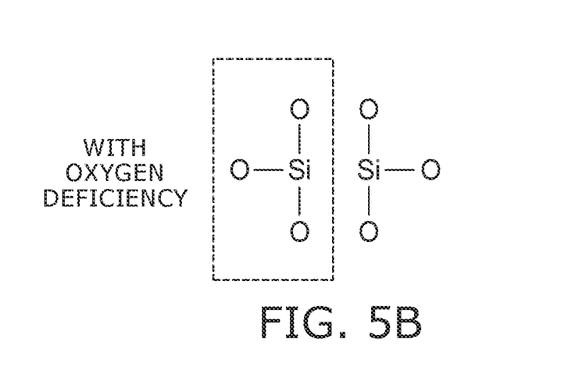
FIG. 5B shows a state with an oxygen deficiency.

FIGS. 5A and 5B show the molecular structure of silicon oxide; FIG. 5A shows a state without an oxygen deficiency; and FIG. 5B shows a state with an oxygen deficiency.

When there is no oxygen deficiency as shown in FIG. 5A, one silicon atom is bonded to four oxygen atoms. Conversely, when there is an oxygen deficiency as shown in FIG. 5B, one silicon atom is bonded to three oxygen atoms; and one bond of the silicon atom is unbonded.

Figure 6A:
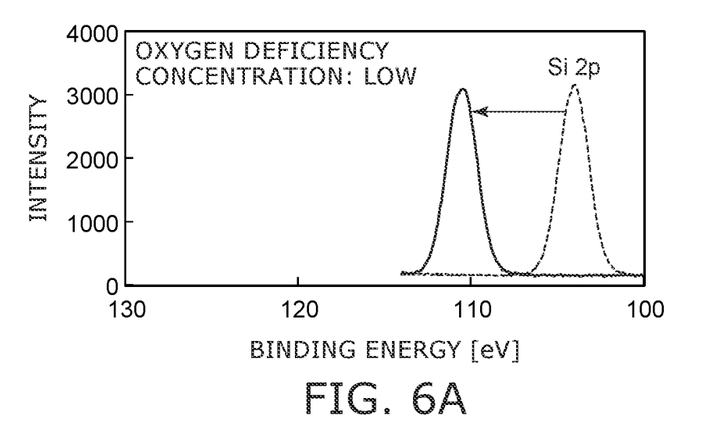
FIG. 6A shows when the oxygen deficiency concentration is low.
Figure 6B:
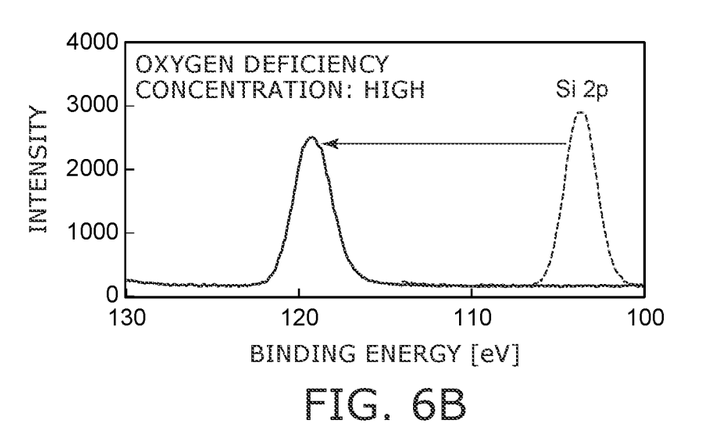
FIG. 6B shows when the oxygen deficiency concentration is high.

FIGS. 6A and 6B show peaks corresponding to the 2p core level (Si 2p) of silicon of XPS (X-ray Photoelectron Spectroscopy) analysis results of silicon oxide, in which the horizontal axis is the binding energy, and the vertical axis is the detection intensity; FIG. 6A shows when the oxygen deficiency concentration is low; and FIG. 6B shows when the oxygen deficiency concentration is high.

The oxygen deficiency concentration of the sample shown in FIG. 6B is about 5 times the oxygen deficiency concentration of the sample shown in FIG. 6A.

As shown in FIGS. 6A and 6B, the peak that corresponds to the 2p core level of silicon shifts toward the high potential side when the oxygen deficiency concentration in silicon oxide increases.

Figure 7:
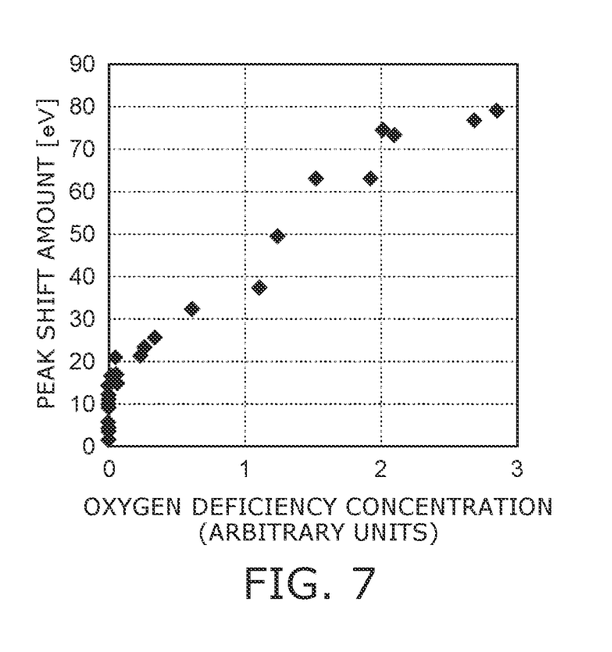
FIG. 7 is a graph showing the effects of the oxygen deficiency on the peak shift amount, in which the horizontal axis is the oxygen deficiency concentration, and the vertical axis is the peak shift amount.

FIG. 7 is a graph showing the effects of the oxygen deficiency on the peak shift amount, in which the horizontal axis is the oxygen deficiency concentration, and the vertical axis is the peak shift amount.

The horizontal axis of FIG. 7 is a relative value of the peak intensity of XPS analysis at the vicinity of 2250 eV; and the peak intensity has a positive correlation with the oxygen deficiency concentration.

As shown in FIG. 7, the peak shift amount increases as the oxygen deficiency concentration in silicon oxide increases. Therefore, XPS analysis of the positive charged region 21 of the insulating film 10 can be used to estimate the oxygen deficiency concentration from the peak shift amount and estimate the positive charge amount.

Third Embodiment

Figures 8A, 8B:
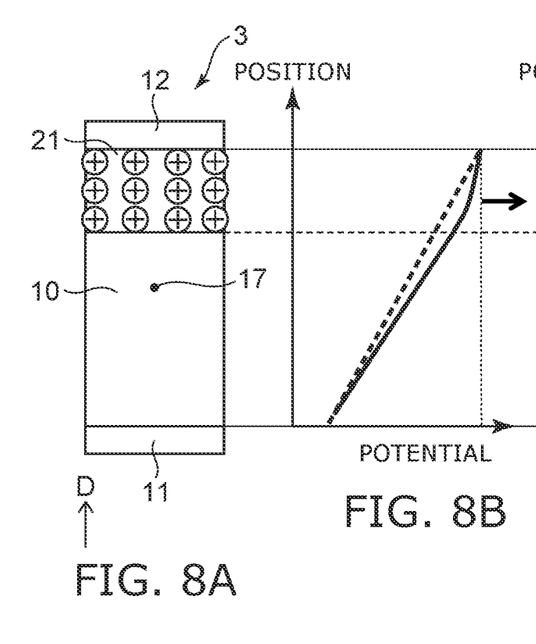
FIG. 8A is a partial cross-sectional view showing an insulating device according to a third embodiment.
FIG. 8B is a graph showing the potential distribution inside the insulating film, in which the vertical axis is the position, and the horizontal axis is the potential.

FIG. 8A is a partial cross-sectional view showing an insulating device according to the embodiment; FIG. 8B is a graph showing the potential distribution inside the insulating film, in which the vertical axis is the position, and the horizontal axis is the potential; and FIG. 8C is a graph showing the electric field strength distribution inside the insulating film, in which the vertical axis is the position, and the horizontal axis is the electric field strength.

The region shown in FIG. 8A corresponds to region A of FIG. 1. The position of the vertical axis in FIGS. 8B and 8C corresponds to that of FIG. 8A. The graphs shown in FIGS. 2B and 2C are respectively shown by broken lines in FIGS. 8B and 8C. This is similar for similar drawings described below as well.

In the insulating device 3 according to the embodiment as shown in FIG. 8A, the positive charged region 21 is positioned at the upper electrode 12 side. More specifically, the positive charged region 21 is positioned between the upper electrode 12 and a midpoint 17 between the lower electrode 11 and the upper electrode 12. The positive charged region 21 may be in contact with or separated from the upper electrode 12.

Figure 8C:
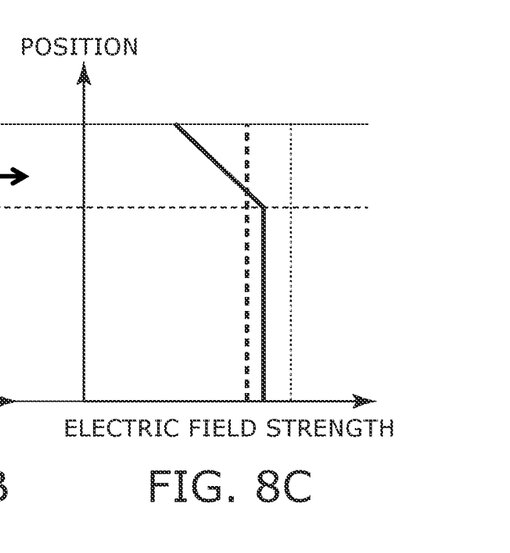
FIG. 8C is a graph showing the electric field strength distribution inside the insulating film, in which the vertical axis is the position, and the horizontal axis is the electric field strength.

According to the embodiment as shown in FIGS. 8B and 8C, the electric field strength at the vicinity of the upper electrode 12 in the insulating film 10 can be effectively reduced. The electric field concentration at the vicinity of the corner 16 of the upper electrode 12 can be more effectively suppressed thereby. Otherwise, the configuration, the operations, and the effects according to the embodiment are similar to those of the first embodiment.

Fourth Embodiment

Figures 9A, 9B:
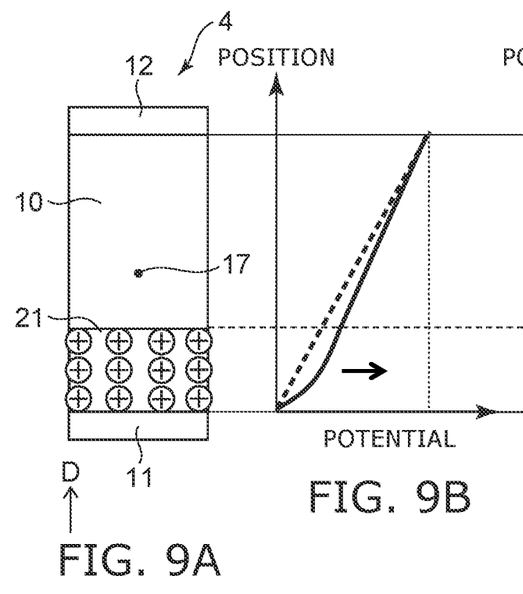
FIG. 9A is a partial cross-sectional view showing an insulating device according to a fourth embodiment.
FIG. 9B is a graph showing the potential distribution inside the insulating film, in which the vertical axis is the position, and the horizontal axis is the potential.

FIG. 9A is a partial cross-sectional view showing an insulating device according to the embodiment; FIG. 9B is a graph showing the potential distribution inside the insulating film, in which the vertical axis is the position, and the horizontal axis is the potential; and FIG. 9C is a graph showing the electric field strength distribution inside the insulating film, in which the vertical axis is the position, and the horizontal axis is the electric field strength.

In the insulating device 4 according to the embodiment as shown in FIG. 9A, the positive charged region 21 is positioned at the lower electrode 11 side. More specifically, the positive charged region 21 positioned between the lower electrode 11 and the midpoint 17 between the lower electrode 11 and the upper electrode 12. The positive charged region 21 may be in contact with or separated from the lower electrode 11.

Figure 9C:
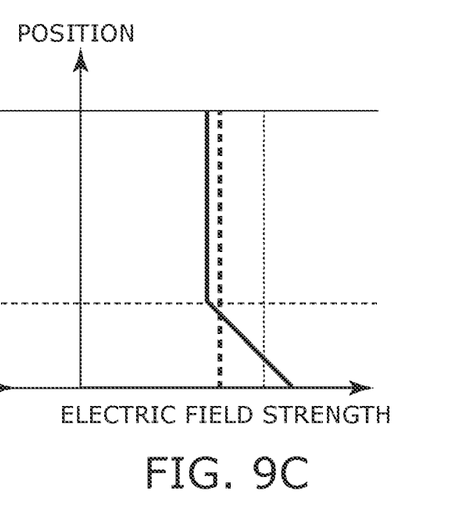
FIG. 9C is a graph showing the electric field strength distribution inside the insulating film, in which the vertical axis is the position, and the horizontal axis is the electric field strength.

According to the embodiment as shown in FIGS. 9B and 9C, the electric field strength can be reduced over a wide region between the upper electrode 12 and the positive charged region 21 of the insulating film 10. Otherwise, the configuration, the operations, and the effects according to the embodiment are similar to those of the first embodiment.

Fifth Embodiment

Figures 10A, 10B:
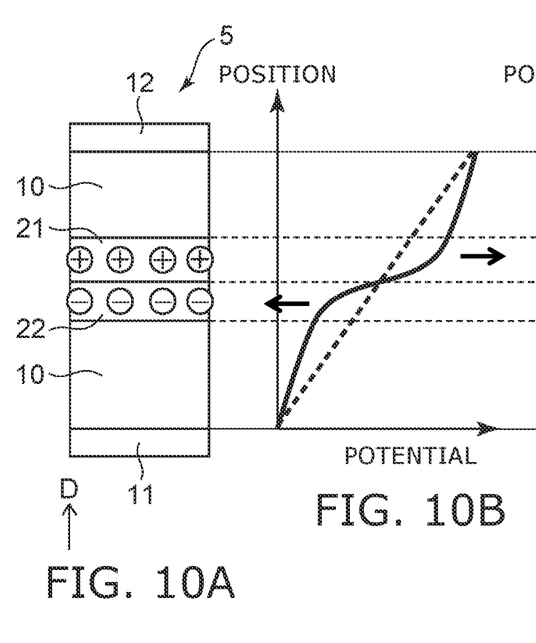
FIG. 10A is a partial cross-sectional view showing an insulating device according to a fifth embodiment.
FIG. 10B is a graph showing the potential distribution inside the insulating film, in which the vertical axis is the position, and the horizontal axis is the potential.
Figure 10C:
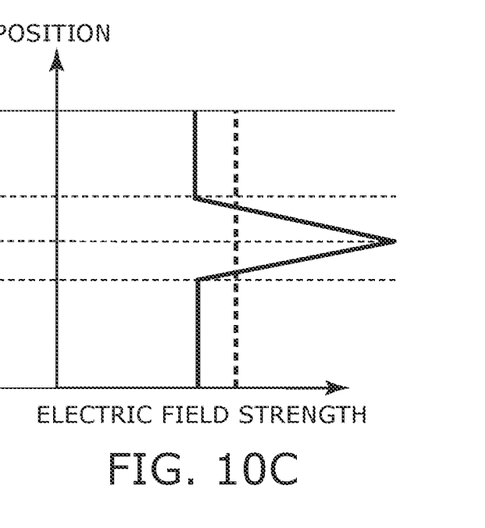
FIG. 10C is a graph showing the electric field strength distribution inside the insulating film, in which the vertical axis is the position, and the horizontal axis is the electric field strength.

FIG. 10A is a partial cross-sectional view showing an insulating device according to the embodiment; FIG. 10B is a graph showing the potential distribution inside the insulating film, in which the vertical axis is the position, and the horizontal axis is the potential; and FIG. 10C is a graph showing the electric field strength distribution inside the insulating film, in which the vertical axis is the position, and the horizontal axis is the electric field strength.

In the insulating device 5 according to the embodiment as shown in FIG. 10A, in addition to the positive charged region 21, a negative charged region 22 is included inside the insulating film 10. The negative charged region 22 stores a negative charge. In FIG. 10A, a negative charge is illustrated by a figure in which the symbol "−" is surrounded with a circle. This is similar for similar drawings described below as well. For example, the negative charge is stored by corona discharge.

According to the embodiment, the negative charged region 22 is located at the lower electrode 11 side of the positive charged region 21. In other words, the negative charged region 22 is positioned between the lower electrode 11 and the positive charged region 21. The negative charged region 22 may be in contact with or separated from the positive charged region 21.

In the insulating device 5 as shown in FIG. 10B, the potential increases in the positive charged region 21; and the potential decreases in the negative charged region 22. Thereby, as shown in FIG. 10C, the electric field strength can be reduced not only at the vicinity of the upper electrode 12 but also at the vicinity of the lower electrode 11. As a result, the reliability of the insulating device 5 is further improved.

Thus, according to the embodiment, by including the negative charged region 22 and the positive charged region 21 inside the insulating film 10, the electric field concentration at the vicinities of the lower electrode 11 and the upper electrode 12 can be suppressed, and the reliability of the insulating device 5 can be increased. Otherwise, the configuration, the operations, and the effects according to the embodiment are similar to those of the first embodiment.

Sixth Embodiment

Figures 11A, 11B:
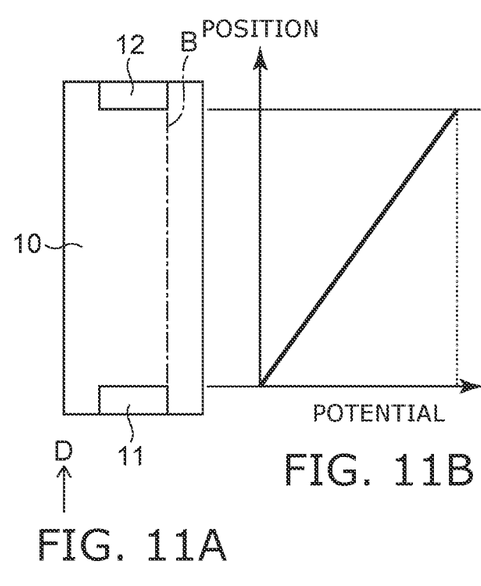
FIG. 11A is a partial cross-sectional view showing an insulating device according to a reference example.
FIG. 11B is a graph showing the potential distribution along single dot-dash line B shown in FIG. 11A, in which the vertical axis is the position, and the horizontal axis is the potential.
Figure 11C:
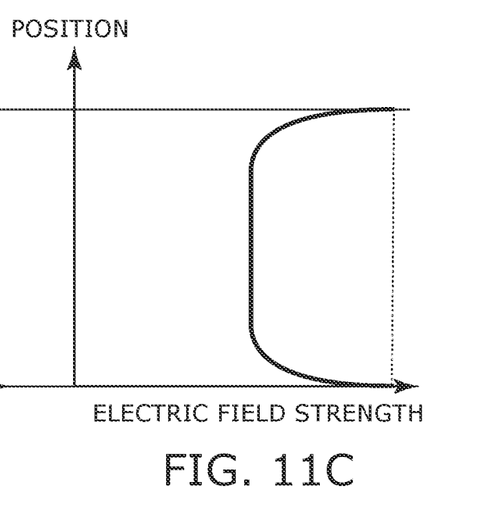
FIG. 11C is a graph showing the electric field strength distribution along single dot-dash line B shown in FIG. 11A, in which the vertical axis is the position, and the horizontal axis is the electric field strength.
Figures 11D, 11E:
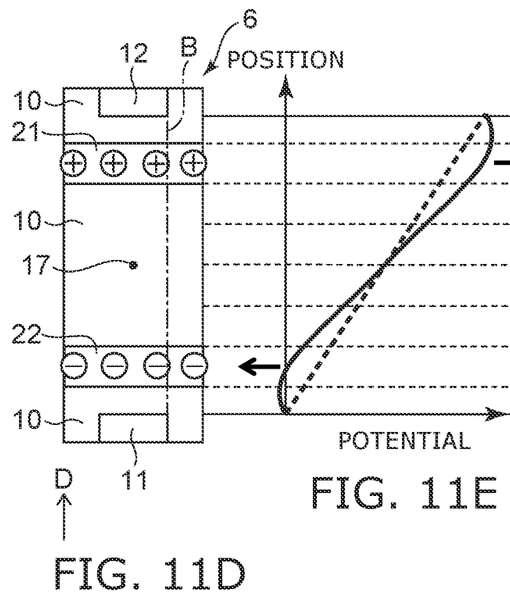
FIG. 11D is a partial cross-sectional view showing the insulating device according to a sixth embodiment.
FIG. 11E is a graph showing a potential distribution along single dot-dash line B shown in FIG. 11D, in which the vertical axis is the position, and the horizontal axis is the potential.

FIG. 11A is a partial cross-sectional view showing an insulating device according to a reference example; FIG. 11B is a graph showing the potential distribution along single dot-dash line B shown in FIG. 11A, in which the vertical axis is the position, and the horizontal axis is the potential; FIG. 11C is a graph showing the electric field strength distribution along single dot-dash line B shown in FIG. 11A, in which the vertical axis is the position, and the horizontal axis is the electric field strength; FIG. 11D is a partial cross-sectional view showing the insulating device according to the embodiment; FIG. 11E is a graph showing a potential distribution along single dot-dash line B shown in FIG. 11D, in which the vertical axis is the position, and the horizontal axis is the potential; and FIG. 11F is a graph showing the electric field strength distribution along single dot-dash line B shown in FIG. 11D, in which the vertical axis is the position, and the horizontal axis is the electric field strength.

FIGS. 11A to 11C show a reference example in which the positive charged region 21 and the negative charged region 22 are not included. FIGS. 11D to 11F show the embodiment in which the positive charged region 21 and the negative charged region 22 are included. The position of the vertical axis in FIGS. 11B and 11C corresponds to that of FIG. 11A. The position of the vertical axis in FIGS. 11E and 11F corresponds to that of FIG. 11D. The graphs shown in FIGS.

Figure 11F:
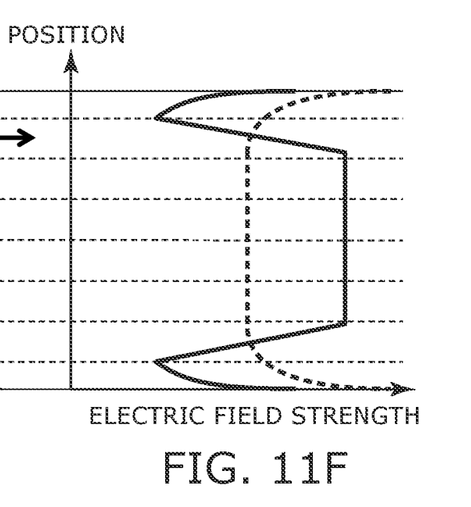
FIG. 11F is a graph showing the electric field strength distribution along single dot-dash line B shown in FIG. 11D, in which the vertical axis is the position, and the horizontal axis is the electric field strength.

11B and 11C are respectively shown by broken lines in FIGS. 11E and 11F. Although the effects of the corners of the lower electrode 11 and the upper electrode 12 are not considered in FIGS. 11B and 11E, the effects of the corners are considered in FIGS. 11C and 11F. This is similar for similar drawings described below as well.

If the positive charged region 21 and the negative charged region 22 are not included as shown in FIGS. 11A to 11C, the electric field concentrates at the vicinity of the end portion of the lower electrode 11 and the vicinity of the end portion of the upper electrode 12 in the insulating film 10; and the electric field strength increases. Thereby, avalanche breakdown easily occurs in these regions.

Conversely, in the insulating device 6 according to the embodiment as shown in FIG. 11D, the negative charged region 22 is located at the vicinity of the lower electrode 11 in the insulating film 10; and the positive charged region 21 is located at the vicinity of the upper electrode 12 in the insulating film 10. More specifically, the negative charged region 22 is positioned between the lower electrode 11 and the midpoint 17 between the lower electrode 11 and the upper electrode 12. The negative charged region 22 may be in contact with or separated from the lower electrode 11. On the other hand, the positive charged region 21 is positioned between the midpoint 17 and the upper electrode 12. The positive charged region 21 may be in contact with or separated from the upper electrode 12. The positive charged region 21 is separated from the negative charged region 22.

Therefore, as shown in FIG. 11E, in the insulating film 10, the potential decreases at the vicinity of the lower electrode 11; and the potential increases at the vicinity of the upper electrode 12. As a result, as shown in FIG. 11F, the electric field strength decreases at the vicinity of the lower electrode 11 and the vicinity of the upper electrode 12 of the insulating film 10; and the electric field concentration at the end portions is relaxed. As a result, the avalanche breakdown does not easily occur; and the reliability of the insulating device 6 is increased. Otherwise, the configuration, the operations, and the effects according to the embodiment are similar to those of the first embodiment.

Seventh Embodiment

Figures 12A, 12B, 12C:
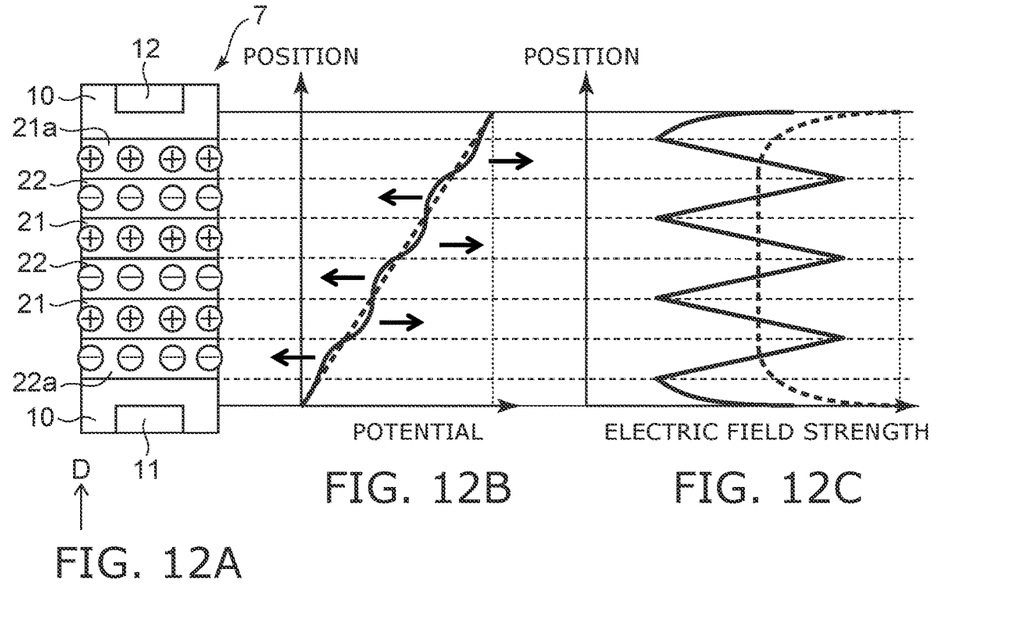
FIG. 12A is a partial cross-sectional view showing an insulating device according to a seventh embodiment.
FIG. 12B is a graph showing the potential distribution inside the insulating film, in which the vertical axis is the position, and the horizontal axis is the potential.
FIG. 12C is a graph showing the electric field strength distribution inside the insulating film, in which the vertical axis is the position, and the horizontal axis is the electric field strength.

FIG. 12A is a partial cross-sectional view showing an insulating device according to the embodiment; FIG. 12B is a graph showing the potential distribution inside the insulating film, in which the vertical axis is the position, and the horizontal axis is the potential; and FIG. 12C is a graph showing the electric field strength distribution inside the insulating film, in which the vertical axis is the position, and the horizontal axis is the electric field strength.

In the insulating device 7 according to the embodiment as shown in FIG. 12A, the multiple positive charged regions 21 and the multiple negative charged regions 22 are alternately arranged along the vertical direction D inside the insulating film 10. In the stacked body made of the multiple positive charged regions 21 and the multiple negative charged regions 22, a negative charged region 22a is located at the position most proximate to the lower electrode 11; and a positive charged region 21a is located at the position most proximate to the upper electrode 12.

Thereby, the potential distribution has a wave shape along the vertical direction D as shown in FIG. 12B; and the electric field strength distribution also has a wave shape along the vertical direction D as shown in FIG. 12C. As a result, compared to the sixth embodiment shown in FIG. 11F, the electric field at the portion of the insulating film 10 between the positive charged region 21a and the negative charged region 22a can be relaxed. Otherwise, the configuration, the operations, and the effects according to the embodiment are similar to those of the first embodiment.

First Modification of Seventh Embodiment

Figures 13A, 13B, 13C:
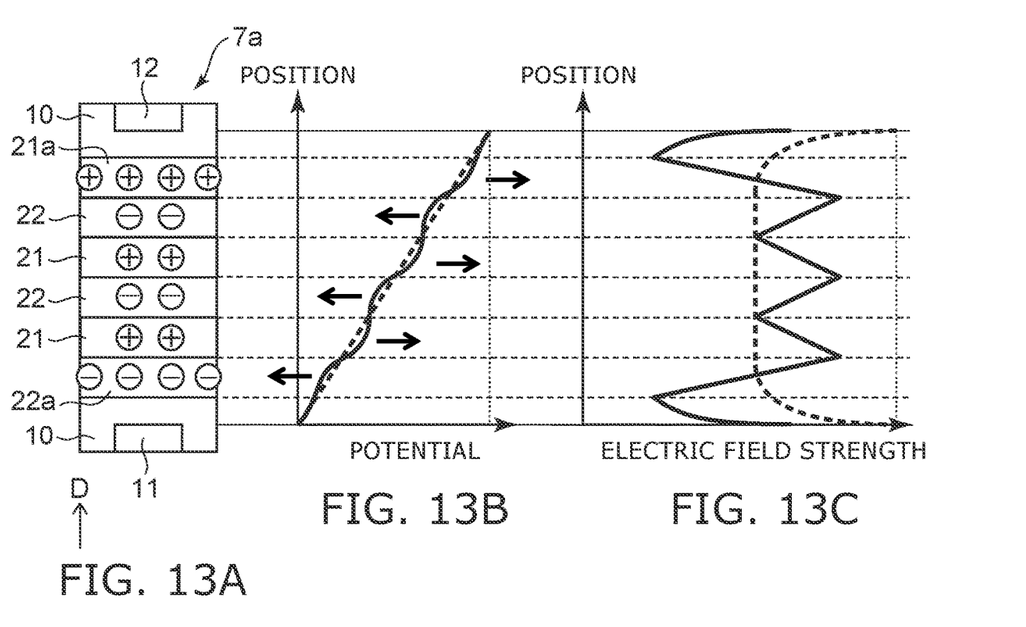
FIG. 13A is a partial cross-sectional view showing an insulating device according to a first modification of the seventh embodiment.
FIG. 13B is a graph showing the potential distribution inside the insulating film, in which the vertical axis is the position, and the horizontal axis is the potential.
FIG. 13C is a graph showing the electric field strength distribution inside the insulating film, in which the vertical axis is the position, and the horizontal axis is the electric field strength.

FIG. 13A is a partial cross-sectional view showing an insulating device according to the modification; FIG. 13B is a graph showing the potential distribution inside the insulating film, in which the vertical axis is the position, and the horizontal axis is the potential; and FIG. 13C is a graph showing the electric field strength distribution inside the insulating film, in which the vertical axis is the position, and the horizontal axis is the electric field strength.

As shown in FIG. 13A, the distribution of the charge amount in the insulating device 7a according to the modification is different from that of the insulating device 7 according to the seventh embodiment (see FIG. 12A). More specifically, among the multiple positive charged regions 21, the positive charge amounts of the charged regions 21 other than the charged region 21a that is most proximate to the upper electrode 12 are less than the positive charge amount of the positive charged region 21a that is proximate to the upper electrode 12. Similarly, among the multiple negative charged regions 22, the negative charge amounts of the charged regions 22 other than the charged region 22a that is most proximate to the lower electrode 11 are less than the negative charge amount of the negative charged region 22a that is most proximate to the lower electrode 11.

The amplitude of the electric field strength at the portion of the insulating film 10 between the positive charged region 21a and the negative charged region 22a can be reduced thereby. According to the state of use of the insulating device, as in the modification, it is effective to adjust the distribution of the charge amount according to the position. Otherwise, the configuration, the operations, and the effects of the modification are similar to those of the seventh embodiment.

Second Modification of Seventh Embodiment

Figures 14A, 14B:
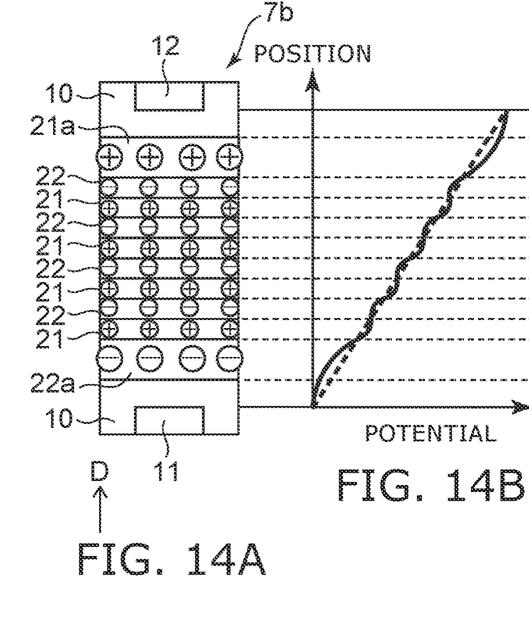
FIG. 14A is a partial cross-sectional view showing an insulating device according to a second modification of the seventh embodiment.
FIG. 14B is a graph showing the potential distribution inside the insulating film, in which the vertical axis is the position, and the horizontal axis is the potential.
Figure 14C:
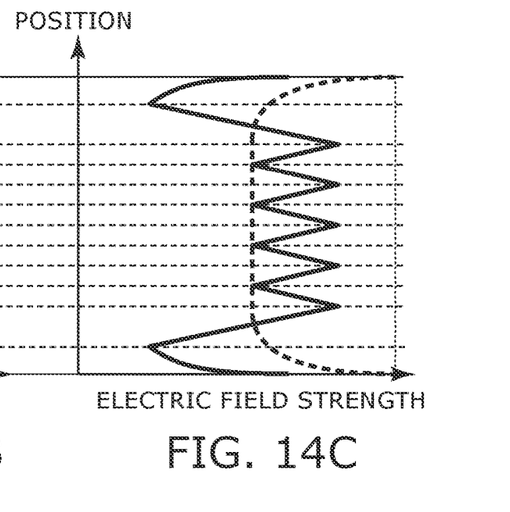
FIG. 14C is a graph showing the electric field strength distribution inside the insulating film, in which the vertical axis is the position, and the horizontal axis is the electric field strength.

FIG. 14A is a partial cross-sectional view showing an insulating device according to the modification; FIG. 14B is a graph showing the potential distribution inside the insulating film, in which the vertical axis is the position, and the horizontal axis is the potential; and FIG. 14C is a graph showing the electric field strength distribution inside the insulating film, in which the vertical axis is the position, and the horizontal axis is the electric field strength.

As shown in FIG. 14A, the arrangement interval of the positive charged region 21 and the negative charged region 22 in the vertical direction D is shorter in the insulating device 7b according to the modification than in the insulating device 7 according to the seventh embodiment (see FIG. 12A). The amplitude of the electric field strength at the portion of the insulating film 10 between the positive charged region 21a and the negative charged region 22a can be reduced thereby. As in the modification, it is effective to adjust the arrangement interval of the charged region according to the state of use of the insulating device. Otherwise, the configuration, the operations, and the effects of the modification are similar to those of the seventh embodiment.

Eighth Embodiment

Figure 15:
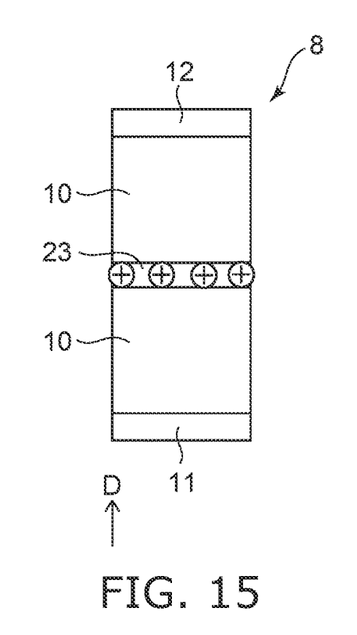
FIG. 15 is a partial cross-sectional view showing an insulating device according to an eighth embodiment.

FIG. 15 is a partial cross-sectional view showing an insulating device according to the embodiment.

The embodiment is an example in which a positive charged region 23 is formed from hafnium oxide instead of an oxygen deficiency of silicon oxide.

In the insulating device 8 according to the embodiment as shown in FIG. 15, the positive charged region 23 is located inside the insulating film 10. The positive charged region 23 includes hafnium (Hf) and oxygen (O), e.g., hafnium oxide ($HfO_2$). The portion of the insulating film 10 other than the positive charged region 23 includes silicon (Si) and oxygen (O), e.g., silicon oxide ($SiO_2$). Thereby, a positive charged region can be realized inside the insulating film 10; and effects similar to those of the first embodiment can be obtained. Otherwise, the configuration, the operations, and the effects according to the embodiment are similar to those of the first embodiment.

According to embodiments described above, an insulating device can be realized in which the reliability can be increased.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Additionally, the embodiments described above can be combined mutually.

What is claimed is:

1. An insulating device, comprising:
a first electrode;
a second electrode; and
an insulating film located between the first electrode and the second electrode, the insulating film including a positive charged region located at a portion in a direction from the first electrode toward the second electrode.

2. The device according to claim 1, wherein
the positive charged region is positioned between the second electrode and a midpoint between the first electrode and the second electrode.

3. The device according to claim 1, wherein
the insulating film further includes a negative charged region located at an other portion in the direction.

4. The device according to claim 3, wherein
the negative charged region is positioned between the first electrode and the positive charged region.

5. The device according to claim 3, wherein
a plurality of the positive charged regions and a plurality of the negative charged regions are alternately arranged along the direction.

6. The device according to claim 1, wherein
a length along the direction of the positive charged region is not less than 500 nm.

7. The device according to claim 1, wherein
a charge density of the positive charged region is not less than $1\times10^{16}$ $cm^{-3}$.

8. The device according to claim 1, wherein
the positive charged region is made of $SiO_x$ (x being less than 2).

9. The device according to claim 1, wherein
the insulating film includes silicon and oxygen, and
an oxygen concentration in the positive charged region is less than an oxygen concentration in a region of the insulating film other than the positive charged region.

10. The device according to claim 1, wherein
the insulating film includes silicon and oxygen, and
the positive charged region includes hafnium and oxygen.

* * * * *